(12) United States Patent
Björkengren et al.

(10) Patent No.: US 11,104,302 B2
(45) Date of Patent: Aug. 31, 2021

(54) METHOD AND VEHICLE SYSTEM FOR HANDLING PARAMETERS ASSOCIATED WITH SURROUNDINGS OF A VEHICLE

(71) Applicant: Volvo Car Corporation, Gothenburg (SE)

(72) Inventors: Ulf Björkengren, Bjärred (SE); Thomas Bove, Copenhagen East (DK); Per Qvist Jessen, Copenhagen (DK)

(73) Assignee: Volvo Car Corporation, Gothenburg (SE)

( * ) Notice: Subject to any disclaimer, the term of this patent is extended or adjusted under 35 U.S.C. 154(b) by 0 days.

(21) Appl. No.: 16/589,219

(22) Filed: Oct. 1, 2019

(65) Prior Publication Data
US 2020/0108796 A1  Apr. 9, 2020

(30) Foreign Application Priority Data
Oct. 4, 2018  (EP) .................................... 18198645

(51) Int. Cl.
*B60R 25/30* (2013.01)
*B60R 11/02* (2006.01)
(Continued)

(52) U.S. Cl.
CPC ........ *B60R 25/305* (2013.01); *B60R 11/0247* (2013.01); *B60R 25/31* (2013.01);
(Continued)

(58) Field of Classification Search
CPC ... B60R 25/305; B60R 11/0247; B60R 25/31; B60R 2011/004; B60R 2300/8073;
(Continued)

(56) References Cited

U.S. PATENT DOCUMENTS

2002/0113696 A1* 8/2002 Nilsson ............... B60R 25/1009
340/541
2003/0095039 A1* 5/2003 Shimomura .......... B60R 25/102
340/426.1
(Continued)

FOREIGN PATENT DOCUMENTS

WO  2013100993 A1  7/2013
WO  2017155448 A1  9/2017

OTHER PUBLICATIONS

Apr. 9, 2019 European Search Report issue on International Application No. EP18198645.

*Primary Examiner* — Daryl C Pope
(74) *Attorney, Agent, or Firm* — Clements Bernard Walker; Christopher L Bernard

(57) ABSTRACT

A method performed by a vehicle system for handling parameters associated with surroundings of a vehicle. The vehicle system obtains information indicating a first parameter associated with the surroundings of the vehicle and sensed by at least one low power sensor. The low power sensor is associated with the vehicle. The vehicle system triggers startup of at least one high power sensor when the first parameter has fulfilled a criteria. The high power sensor consumes a larger amount of power than the low power sensor, and the high power sensor is associated with the vehicle or another vehicle. The vehicle system obtains information indicating at least a second parameter associated with the surroundings of the vehicle and sensed by the high power sensor.

18 Claims, 4 Drawing Sheets

(51) Int. Cl.
*B60R 25/31* (2013.01)
*B60R 11/00* (2006.01)

(52) U.S. Cl.
CPC . *B60R 2011/004* (2013.01); *B60R 2300/8073* (2013.01); *B60R 2325/10* (2013.01)

(58) Field of Classification Search
CPC . B60R 2325/10; B60R 25/104; G08B 25/002; G08B 13/19695; G08B 13/19647
See application file for complete search history.

(56) References Cited

U.S. PATENT DOCUMENTS

| | | | |
|---|---|---|---|
| 2007/0236497 A1 | 10/2007 | Kondo | |
| 2016/0325680 A1* | 11/2016 | Curtis | H04N 5/23293 |
| 2019/0283709 A1* | 9/2019 | Lu | H04N 7/188 |

* cited by examiner

METHOD AND VEHICLE SYSTEM FOR HANDLING PARAMETERS ASSOCIATED WITH SURROUNDINGS OF A VEHICLE

CROSS-REFERENCE TO RELATED APPLICATION

The present disclosure claims the benefit of priority of co-pending European Patent Application No. 18198645.6, filed on Oct. 4, 2018, and entitled "METHOD AND VEHICLE SYSTEM FOR HANDLING PARAMETERS ASSOCIATED WITH SURROUNDINGS OF A VEHICLE," the contents of which are incorporated in full by reference herein.

TECHNICAL FIELD

Embodiments herein relate generally to a vehicle system, a method performed by the vehicle system and a vehicle comprising the vehicle system. More particularly the embodiments herein relate to handling parameters associated with surroundings of a vehicle.

BACKGROUND

Security related to people's properties is important today. Home security systems and vehicle security systems are common property both as a precautionary measure to minimize risk of becoming burglarized, warn the owners and as a way to stress burglars in case of an entry. The home security systems and the vehicle security systems can operate separately or in cooperation. However, there is still a need for improvement and new development of both home and vehicle security systems.

Vehicles are being equipped with more cameras and other sensors, and these contribute to a power consumption problem when they are continuously activated. It is therefore necessary to consider the type of sensor with regards to power consumption and the need for activating high power consumption sensors.

US2014300492 discloses a home security system sensing an abnormality, which then leads to communication to the vehicle security system to activate its alarm actuators, or use of vehicle sensors for acquiring more information, but only after alarm activation from the home security system.

JP201123287 uses an in-vehicle camera as one sensor among others of the home security system. As it is recognized that a camera is consuming significant power for continuous use, it is supplied via cable from the house. This cable is also used for the communication between the home and the vehicle. An in-vehicle obstacle detection unit complements the camera, and triggers the in-home system. The vehicle is power supplied from the home.

Therefore, there is a need to at least mitigate or solve the above issue.

SUMMARY

An objective of embodiments herein is therefore to obviate at least one of the above disadvantages and to reduce power consumption associated with a vehicle.

According to a first aspect, the objective is achieved by a method performed by a vehicle system for handling parameters associated with surroundings of a vehicle. The vehicle system obtains information indicating a first parameter associated with the surroundings of the vehicle and sensed by at least one low power sensor. The low power sensor is associated with the vehicle. The vehicle system triggers startup of at least one high power sensor when the first parameter has fulfilled a criteria. The high power sensor consumes a larger amount of power than the low power sensor. The high power sensor is associated with the vehicle or another vehicle. The vehicle system obtains information indicating at least a second parameter associated with the surroundings of the vehicle and sensed by the high power sensor.

According to a second aspect, the objective is achieved by a vehicle system adapted to obtain information indicating a first parameter associated with the surroundings of the vehicle and sensed by at least one low power sensor. The low power sensor is associated with the vehicle. The vehicle system is adapted to trigger startup of at least one high power sensor when the first parameter has fulfilled a criteria. The high power sensor consumes a larger amount of power than the low power sensor. The high power sensor is associated with the vehicle or another vehicle. The vehicle system is adapted to obtain information indicating at least a second parameter associated with the surroundings of the vehicle and sensed by the high power sensor.

According to a third aspect, the objective is achieved by a vehicle comprising the vehicle system.

Since the low power sensor, which consumes very little energy, triggers the high power sensor only when the first parameter has fulfilled the criteria, the power consumption associated with the vehicle is reduced in that the high power sensor is triggered only in certain cases and is not always on.

Embodiments herein afford many advantages, of which a non-exhaustive list of examples follows:

An advantage of the embodiments herein is that the power consumption is reduced due to use of low power sensors for monitoring and sensing parameters associated with the surrounding of the vehicle.

Another advantage of the embodiments herein is that life-time of the high-power sensors is increased, and the wear of such sensors is reduced due to that the high power sensors are in operation only when triggered by that the parameter sensed by the low power sensor has fulfilled the criteria, i.e. they are not continuously in operation.

A further advantage of the embodiments herein is that the detection of surroundings of the vehicle is improved in that both a first and second parameter related to the surroundings of the vehicle is obtained, which provides a detailed view of the surroundings for further analysis and handling.

Another advantage of the embodiments herein is that the detection of vehicle surroundings is further improved by the combination of detections from multiple vehicles.

Furthermore, an advantage of the embodiments herein is that the estimation of the position of the security breach event is improved by combination of the position estimation from multiple vehicles.

The embodiments herein are not limited to the features and advantages mentioned above. A person skilled in the art will recognize additional features and advantages upon reading the following detailed description.

BRIEF DESCRIPTION OF THE DRAWINGS

The embodiments herein will now be further described in more detail by way of example only in the following detailed description by reference to the appended drawings illustrating the embodiments and in which.

The drawings are not necessarily to scale and the dimensions of certain features may have been exaggerated for the sake of clarity. Emphasis is instead placed upon illustrating the principle of the embodiments herein.

DETAILED DESCRIPTION

Figure 1:
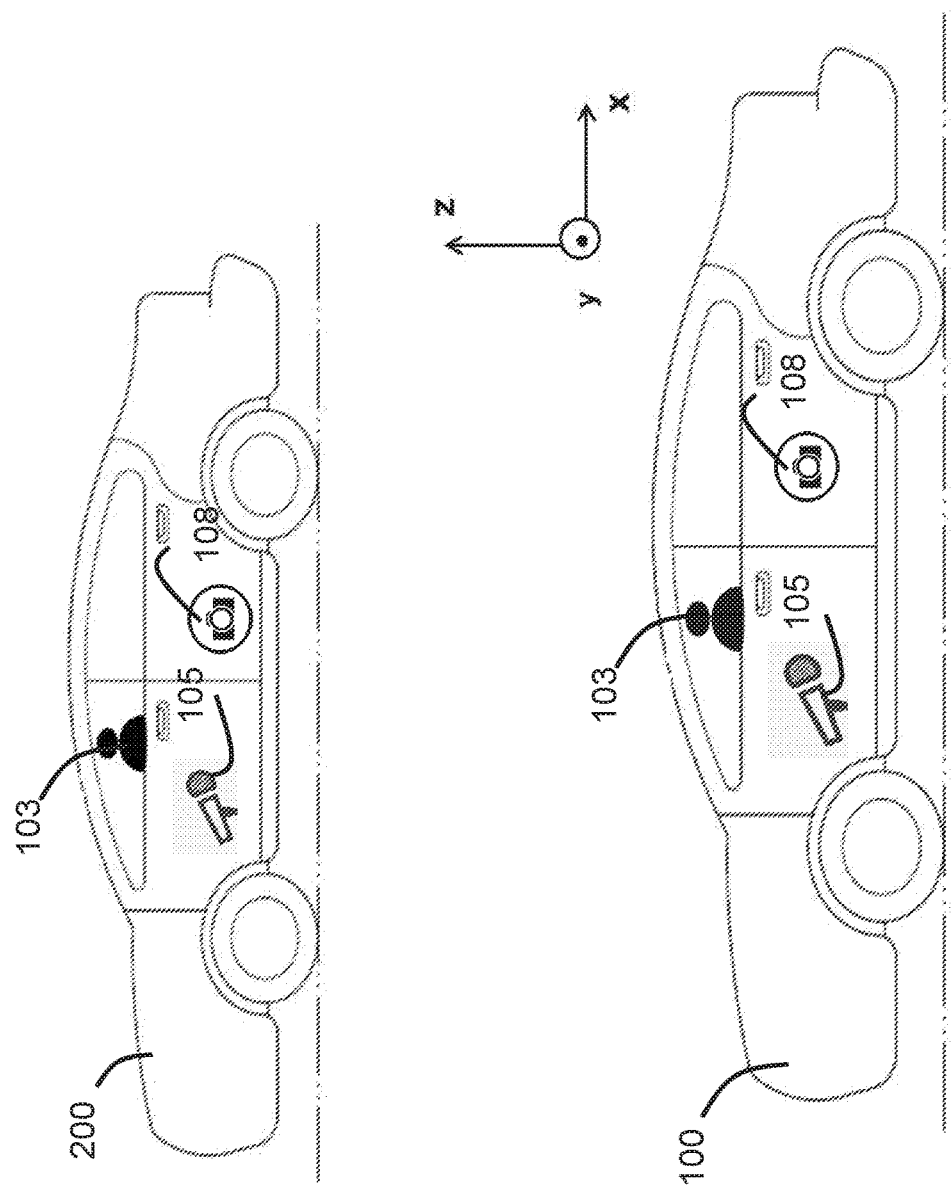
FIG. 1 is a schematic drawing illustrating an example of a vehicle.

FIG. 1 is a schematic drawing illustrating a vehicle 100. The vehicle 100 may be any arbitrary vehicle, for instance a car, truck, lorry, van, bus, motorcycle etc. The vehicle 100 may be at least partly autonomous or self-driven, it may be completely autonomous or self-driven, or it may be non-autonomous etc. The vehicle 100 may also be referred to as a first vehicle 100.

At least one user 103 may be associated with the vehicle 100. The user 103 may be associated with the vehicle 100 in that it is located inside the vehicle 100, that it is located in proximity of the vehicle 100, that it is an owner of the vehicle 100, that it has a User Equipment (UE) connected to the vehicle 100 or similar. The user 103 may be also referred to as a vehicle operator, a passenger, a vehicle occupant, a driver etc.

The UE mentioned above may be a device by which a subscriber may access services offered by an operator's network and services outside operator's network to which the operator's radio access network and core network provide access, e.g. access to the Internet. The UE may be any device, mobile or stationary, enabled to communicate over a radio channel in the communications network, for instance but not limited to e.g. user equipment, mobile phone, smart phone, sensors, meters, vehicles, household appliances, medical appliances, media players, cameras, Machine to Machine (M2M) device, Internet of Things (IOT) device, terminal device, communication device or any type of consumer electronic, for instance but not limited to television, radio, lighting arrangements, tablet computer, laptop or Personal Computer (PC). The device may be portable, pocket storable, hand held, computer comprised, or vehicle mounted devices, enabled to communicate voice and/or data, via the radio access network, with another entity, such as another device or a server.

The vehicle 100 is associated with sensors such as at least one low power sensor 105 and at least one high power sensor 108. Both the low power sensor 105 and the high power sensor 108 are adapted to sense the surroundings of the vehicle 100, i.e. the outside of the vehicle 100. The low power sensor 105 is a sensor which consumes a low amount of power which is lower than the power consumption of the high power sensor 108 when operating. The low power sensor 105 is always on, i.e. it is intended to continuously and/or intermittently sense the surroundings of the vehicle 100. The high power sensor 108 is adapted to be turned on when triggered, and is in sleep mode the rest of the time, i.e. it is intended to sense the surroundings of the vehicle 100 only when triggered. The sensors 105, 108 may be comprised in the vehicle 100, or they may be a standalone sensor connected to the vehicle 100.

The low power sensor 105 may be for example a microphone, a gyroscope, a smoke detector, an Infrared, IR, detector etc. The high power sensor 108 may be for example an image sensor, a radar, a lidar etc. For example, a microphone may sense sounds in the surroundings of the vehicle 100 and an image sensor may capture images of the surroundings of the vehicle. In another example, a gyroscope may sense motion, e.g. vibrations, due to for example an explosion in the surroundings of the vehicle 100, and the image sensor may capture images of the explosion.

For example, microphone based sensors may operate in the milli Watt (mW) range, and image based sensors may operate in the Watt (W) range. That is, the ratio between consumed power of the low power sensor 105 and the high power sensor 108 may be 1:2000, it may be 1:1500, it may be 1:1000, it may be 1:800, it may be 1:500 or any other suitable ratio.

The low power sensor 105 is adapted to sense a first parameter and the high power sensor 108 is adapted to sense a second parameter. For example, if the low power sensor is a microphone, then the first parameter is a sound, and if the high power is an image sensor, then the second parameter is an image of the surroundings.

The vehicle 100 may comprise any suitable number of low and high power sensors 105, 108. The low and high power sensors 105, 108 may be mounted on the inside or the outside of the vehicle 100, at least partly on the inside of the vehicle 100, at least partly on the outside of the vehicle 100 or mounted at a location of the vehicle 100 which is suitable for sensing the surroundings of the vehicle 100. For example, the low and high power sensors 105, 108 may be mounted on one side of the vehicle 100, they may be mounted on the front of the vehicle 100, there may be at least one low power sensor 105 mounted on each side of the vehicle 100 and at least one high power sensor 108 may be mounted on the front of the vehicle 100 etc. At least one of the low and high power sensors 105, 108 may be located at the inside of the vehicle 100, for example mounted on the inside of the windscreen of the vehicle 100, mounted on the rear-view mirror etc.

The vehicle 100 may comprise a display (not shown) through which the vehicle system, the vehicle and/or the user 103 can communicate with each other. For example, the vehicle system may present information to the user 103 on the display.

There may be at least one other vehicle 200 located in the surroundings of the vehicle 100. The at least one other vehicle 200 may also be referred to as a second vehicle 200. There may be one, two or more other vehicles 200. The at least one other vehicle 200 is associated with at least one low power sensor 105 and at least one high power sensor 108, as in the vehicle 100. The sensors 105, 108 may be comprised in the at least one other vehicle 200, or they may be a standalone sensor connected to the at least one other vehicle 200. In addition, at least one user 103 may be associated with the at least one other vehicle 200. The user 103 of the other vehicle 200 may be the same or a different user than of vehicle 100.

The vehicle 100 and the at least one other vehicle 200 may be comprised in a network of vehicles. The vehicle 100 and the at least one vehicle 200 may be located for example at a parking lot, outside the user's 103 home or at any other suitable location. The vehicle 100 and the at least one other vehicle 200 are adapted to communicate with each other using for example a wired or wireless communication technology, e.g. mobile communication, WiFi, Bluetooth etc. The vehicles 100, 200 may communicate directly with each other or indirectly via the user's 103 mobile phones, a cloud device, a vehicle system or any other suitable intermediate device or system. The connection between the vehicles 100, 200 may use any suitable protocol depending on type and level of layer (e.g. as indicated by the OSI model) as understood by the person skilled in the art.

The vehicle 100 is associated with a vehicle system (not shown). The vehicle system may be associated with the vehicle 100 in that it is at least partly comprised in the vehicle 100 or that it is a standalone system which is adapted to communicate with the vehicle 100. The vehicle system may also or instead be associated with the at least other vehicle 200, for example by that it is at least partly comprised in the other vehicle 200 or adapted to communicate with the other vehicle 200. The functions of the vehicle system will be described below in more detail with reference to FIG. 3.

Directions as used herein, e.g. horizontal, vertical, lateral, relate to when the load cover arrangement is mounted in a vehicle, with the vehicle 100 standing on flat ground.

A coordinate system is illustrated in FIG. 1 which shows that the x-axis represents the direction backwards in the vehicle 100, 200, the z-axis represents the upwards direction and the y-axis represents the left direction seen from the front of the vehicle 100, 200.

Figure 2:
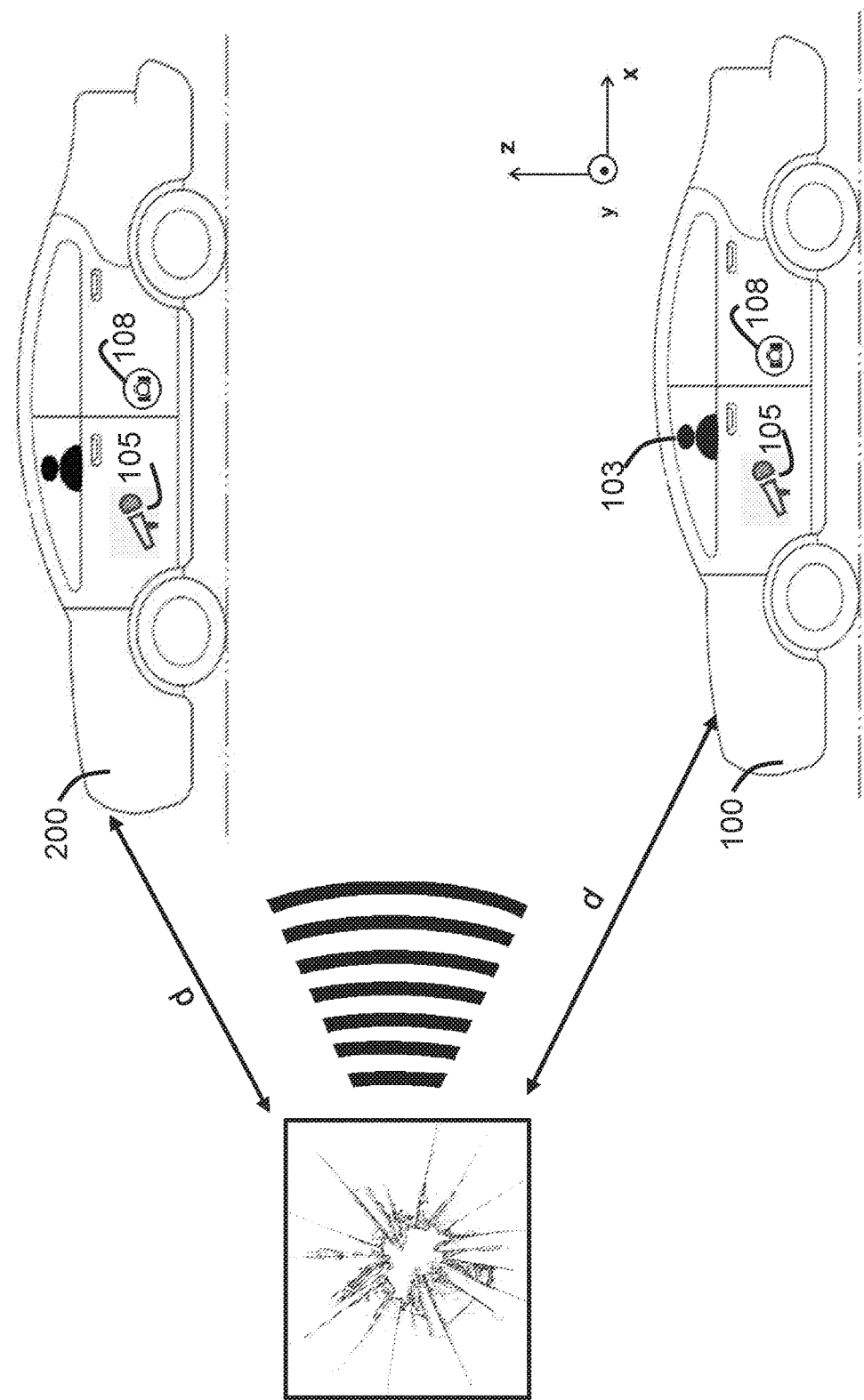
FIG. 2 is a schematic drawing illustrating an example of a vehicle and its surroundings.

FIG. 2 is a schematic drawing illustrating an example where a glass breakage occurs in the surroundings of the vehicle 100. The low power sensor 105 which continuously senses or monitors the surroundings of the vehicle 100 senses the sound of the glass breakage, i.e. the first parameter sensed by the low power sensor 105 is a sound. In case there is at least one other vehicle 200 located in the surroundings of the vehicle 100, the other vehicle's low power sensor 105 may also sense the sound of the glass breakage, i.e. the first parameter. The glass breakage may occur at a distance d from the vehicle 100.

Figure 3:
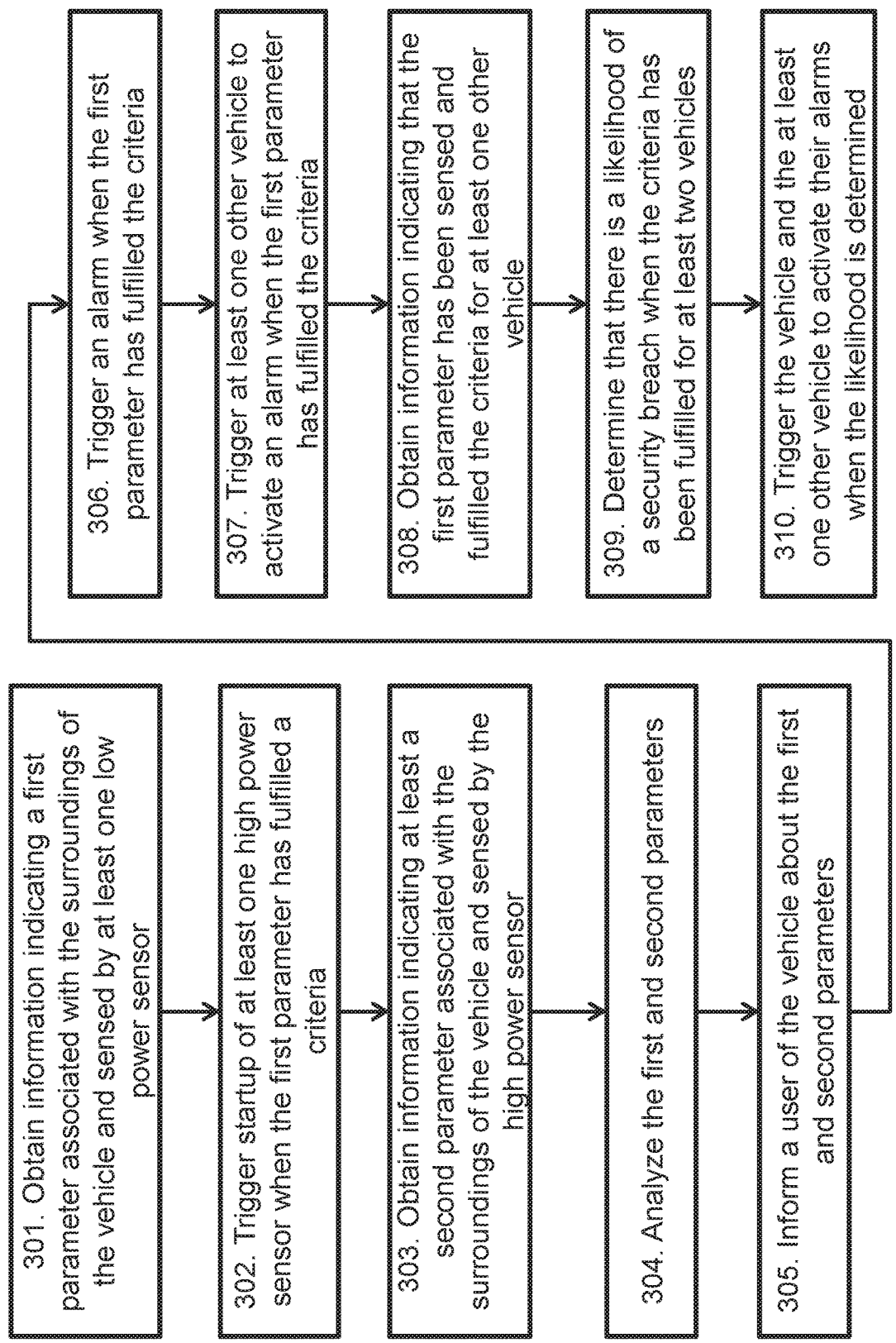
FIG. 3 is a flow chart illustrating an example of a method performed by a vehicle system.

A method performed by the vehicle system for handling parameters associated with surroundings of a vehicle 100, according to some embodiments will now be described with reference to the flowchart depicted in FIG. 3. When reviewing FIG. 3 the following example may be considered: A window in a house has been broken in an attempt to burgle the house. The vehicle 100, and possibly also the other vehicle 200, if present, are located on the street outside the house. The method in FIG. 3 comprises at least one of the following steps, which steps may as well be carried out in another suitable order than described below.

Step 301

The vehicle system obtains information indicating a first parameter associated with the surroundings of the vehicle 100 and sensed by at least one low power sensor 105. In the example with the broken window, the first parameter may be the sound of the glass breakage sensed by a vehicle microphone as the low power sensor 105.

The low power sensor 105 may have sensed the first parameter at one time instance or for a period of time.

The vehicle 100 may be standing still or it may be moving when the low power sensor 105 senses the first parameter.

Step 302

The vehicle system triggers startup of at least one high power sensor 108 when the first parameter has fulfilled a criteria. The criteria may be that the first parameter has reached or exceeded a threshold, or that the first parameter substantially matches a predetermined parameter.

For example, the criteria may be that a sound sensed by a microphone has reached or exceeded a threshold of x dB, where x is any positive integer. In another example, the criteria may be that the sensed sound is identified as glass breakage by comparing the sensed sound with already known sound types. Thus, the predetermined parameter may be for example a known sound type such as glass breakage, a scream etc. Fulfilling the criteria may be associated with a security breach in the surroundings of the vehicle 100.

When the criterion has not been fulfilled, the first parameter may be that the sound is below the threshold, i.e. that it is so low that it not considered being associated with a security breach.

The high power sensor 108 consumes a larger amount of power than the low power sensor 105. Both the low and high power sensors 105 are associated with the vehicle 100. The sensors 105, 108 may be associated with the vehicle 100 in that they are mounted at least partly on the outside of the vehicle 100, that they are adapted to sense the vehicle's surroundings and to communicate with the vehicle 100 etc.

In case of a network of vehicles 100, 200, the low power sensor 105 in any of the vehicles 100, 200 may obtain the first parameter and may then trigger a high power sensor 108 in itself or in any other suitable vehicle 100, 200 in the network.

Step 303

The vehicle system obtains information indicating at least a second parameter associated with the surroundings of the vehicle 100 and sensed by the high power sensor 108. The second parameter may be for example an image of the surroundings of the vehicle 100, e.g. an image of the broken window. The at least one second parameter may be obtained after the startup of the high power sensor 108 has been triggered in step 302.

The vehicle 100 may be standing still or it may be moving when the high power sensor 108 senses the second parameter.

Step 304

The vehicle system may analyze the first and second parameters to determine at least one of: a position in the surroundings where the first and second parameters have their origin, the direction to the origin and/or a distance (d) from the vehicle 100 to the position. In other words, the vehicle system may determine the position and/or distance to the place where the glass has been broken.

The vehicle system may determine the distance (d) and/or direction from multiple vehicles, e.g. the vehicle 100 and the at least one other vehicle 200, to the origin of the first and second parameters. The vehicle system may combine the determined position, direction and/or distance in order to improve the quality of the position determination.

In order to determine the position, direction and distance, the principle of time-of-flight (TOF), Time-of-arrival (TOA) or Time-difference-of-arrival (TDOA) may be applied.

With a low power sensor 105 such a loudspeaker, it is possible for the vehicle 100 to transmit a sound message, and then use its microphones to register any possible reflections of this sound message. A TOF measurement is then possible, which can be used to calculate the distance to the reflecting object. This may be referenced to as a "scan". Two subsequent scans that yield two reflection profiles, can be used to identify any moving objects in the surroundings of the vehicle 100.

The frequency of the sound messages used herein may be in the upper range, e.g. 17 kHz-20 kHz, of the audible range of 20 Hz-20 kHz, as this range is almost inaudible to most humans. However, the microphones may have a wider range than 17 kHz-20 kHz, so they will be able to detect also sound waves that are likely to occur in different alarm situations, a person screaming, glass being broken, etc.

Step 305

The vehicle system may inform a user 103 of the vehicle 100 about the first and second parameters. This may be done by for example displaying the first and second parameters on the display comprised in the vehicle 100. With the information about the first and second parameters, the user 103 can manually or using a suitable analyze device analyze them in order to take further security measures, e.g. calling the police in case of a burglary.

Step 306

The vehicle system may trigger an alarm associated with the vehicle 100 when the first parameter has fulfilled the criteria. The alarm may be at least one of: blinking with the vehicle lights, honking the vehicle horn, activation of notifying an emergency service, activation of notifying the vehicle's manufacturer etc. The alarm may be associated with the vehicle 100 in that it is comprised in the vehicle 100 or it may be a standalone alarm connected to the vehicle 100.

Step 307

The vehicle system may trigger at least one other vehicle 200 to activate its associated alarm when the first parameter has fulfilled the criteria. Thus, both the vehicle 100 and the at least one second vehicle 200 may activate their respective associated alarms when the criteria is fulfilled. If any vehicle 100, 200 in a network of multiple vehicles identifies a security breach, alarm(s) can be triggered in all relevant vehicles 100, 200 in the network. When two vehicles 100, 200 activates their alarms, it will be more likely that the user 103 or any other person located nearby the vehicles 100, 200 will notice the activated alarms and perform further investigations of the reason for the activation. Consequently, the safety will be increased.

Step 308

The vehicle system may obtain information indicating that the first parameter has been sensed and fulfilled the criteria for at least one other vehicle 200. This step corresponds to step 301 but with the difference that the first parameter is associated with the at least one other vehicle 200. With both steps 301 and 308, both the vehicle 100 and the at least one other vehicle 200 sense the first parameter with their respective low power sensor 105 and detect that they fulfill the criteria.

Step 309

The vehicle system may determine that there is a likelihood of a security breach when the criterion has been fulfilled for at least two vehicles 100, 200. The security breach may be associated with the surroundings of at least one of the vehicles 100, 200.

Step 310

The vehicle system may trigger the vehicle 100 and the at least one other vehicle 200 to both activate their vehicle alarms when the likelihood is determined.

Figure 4:
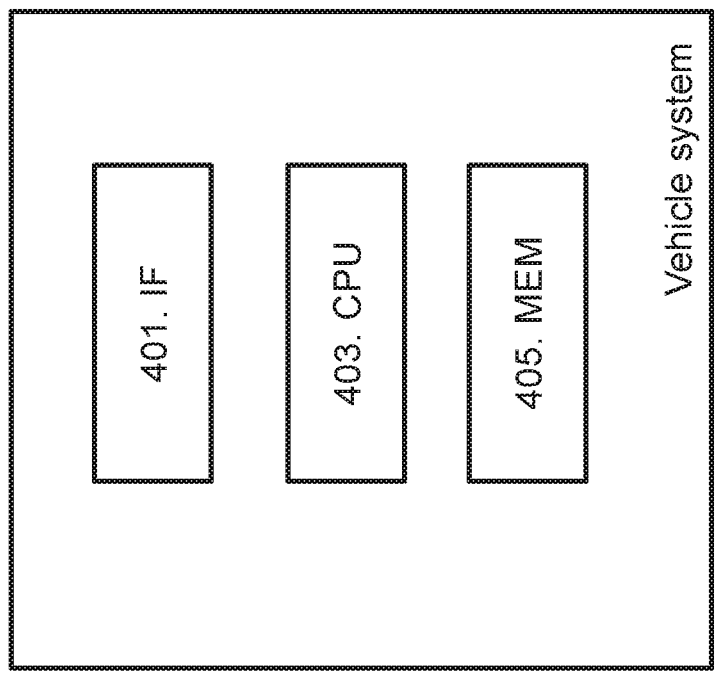
FIG. 4 is a schematic block diagram illustrating embodiments of the vehicle system.

In FIG. 4, there is shown a vehicle system comprising a processor CPU 401, an interface IF 403 and a memory, MEM 405, in which memory instructions are stored for carrying out the method steps explained above. CPU is short for Central Processing Unit. The vehicle system communicates via the interface IF 403. The IF 403 comprises both an external interface, communicating with a transmitter and receiver, and internal interfaces (not shown).

The vehicle system is adapted to, e.g. by means of the CPU 401, obtain information indicating a first parameter associated with the surroundings of the vehicle 100 and sensed by at least one low power sensor 105, the low power sensor 105 being associated with the vehicle 100. The vehicle system is adapted to, e.g. by means of the CPU 401, trigger startup of at least one high power sensor 108 when the first parameter has fulfilled a criteria. The high power sensor 108 consumes a larger amount of power than the low power sensor 105. The high power sensor 108 is associated with the vehicle 100 or another vehicle 200. The criteria may be at least one of: that the first parameter has reached or exceeded a threshold, and that the first parameter substantially matches a predetermined parameter. The first parameter may be at least one of: sound, motion, smoke, and the second parameter may be at least one an image.

The vehicle system is adapted to, e.g. by means of the CPU 401, obtain information indicating at least a second parameter associated with the surroundings of the vehicle 100 and sensed by the high power sensor 108.

The low power sensor 105 may be at least one of: a microphone, a gyroscope, a smoke detector, an Infrared detector, and the high power sensor 108 may be at least one of: an image sensor, a radar, a lidar.

At least one of the low and high power sensors 105, 108 may be mounted at least partly on the outside of the vehicle 100.

The vehicle system may be further adapted to, e.g. by means of the CPU 401, analyze the first and second parameters to determine at least one of: a position in the surroundings where the first and second parameters have their origin, and a distance (d) from the vehicle 100 to the position.

The vehicle system may be further adapted to, e.g. by means of the CPU 401, inform a user 103 of the vehicle 100 about the first and second parameters.

The vehicle system may be further adapted to, e.g. by means of the CPU 401, trigger an alarm associated with the vehicle 100 when the first parameter has fulfilled the criteria The vehicle system may be further adapted to, e.g. by means of the CPU 401, trigger at least one other vehicle 200 to activate its associated alarm when the first parameter has fulfilled the criteria.

The vehicle system may be further adapted to, e.g. by means of the CPU 401, obtain information indicating that the first parameter has been sensed and fulfilled the criteria for at least one other vehicle 200. The vehicle system may be further adapted to, e.g. by means of the CPU 401, determine that there is a likelihood of a security breach when the criteria has been fulfilled for at least two vehicles 100, 200. The vehicle system may be further adapted to, e.g. by means of the CPU 401, trigger the vehicle 100 and the at least one other vehicle 200 to activate their associated alarms when the likelihood is determined.

The at least one low power sensor 105 may be intended to continuously and/or intermittently sense the first parameter, and the at least one high power sensor 108 may be intended to sense the second parameter for an arbitrary or predetermined period of time only when triggered.

The embodiments herein benefit from the fact that vehicles 100, 200 will be equipped with more cameras and other sensors as more advanced safety systems and self-driving functionalities are introduced. These could be used for standstill scenarios where the sensors can monitor the exterior of the user's home. Object identification could be used to ensure that the vehicle alarm does not respond to e.g. a cat or a dog.

In case of an entry into the exterior security zone, an alarm will be triggered. This would also be the case if the interior alarm is triggered. In both cases the alarms on the vehicle 100, 200 will engage with honks and/or lights to stress the trespassers.

The embodiments herein may require that the vehicle 100 is at least running on low power. For electric vehicles, the embodiments herein may depend on whether it is plugged in to a charger or not. If it is not plugged in it would mainly be using low power sensors 105, e.g. acoustic sensors, that could trigger more energy-consuming high power sensors 108, e.g. image sensors, whereas if it is plugged in it would be able to use all the sensors all the time.

The vehicle 100 may be seen as a security system proxy that could be extended to a neighborhood solution. In case of intrusion to one of a series of homes connected to a community security network the vehicles 100, 200 could engage an alarm, potentially with variable light and sound intensity dependent on the distance to the place of the event. It could also be used as a way to protect the locals in the community in case of a physical attack where a network of vehicles 100, 200 could start to honk if an alarm is triggered, e.g. from a smart phone.

Positioning systems used for positioning of UE's, e.g. a smart phone, in proximity of a vehicle 100, 200 by using near ultrasound acoustic signals may use acoustic sensors that cover the normal audible frequency range. Hence they can be used for listening after also other acoustic signals, such as glass breakage, cries for help, gun shots, etc. Thus, the vehicle system will be able to not only detect potential security related signals, but may also provide an expected position of the acoustic source. The low power sensor 105 such as e.g. a microphone of the positioning system consumes very little energy, which makes it feasible to run continuously to listen for acoustic signals without risk of battery depletion. The complete positioning system based on near ultrasound consumes rather low energy so it can in parallel with the microphones continuous listening also scan the proximity periodically, identifying "dynamic" objects, also without risk of a too fast battery depletion.

If detected acoustic signals, or scanned dynamic objects exceeds some defined trigger level, i.e. fulfills the earlier mentioned criteria, other high power sensors 108 which are more battery consuming sensors like cameras can be started to more precisely identify the potential security breach event.

Camera captures can be analyzed by the vehicle system 100, by the user 103 of the vehicle 100 etc.

A detected potential security breach event may be communicated to preconfigured receivers, and can be sent over any remote communication channel that is available to the vehicle 100, such as cellular telephony, wifi, or Bluetooth, as well as triggering e.g. visual/acoustic warning signals on the vehicle 100. Examples of preconfigured receivers may be associated with family members, neighbors, police, security firms etc.

In some scenarios, such as if the vehicle 100 stands on a parking lot in a city, the vehicle system may detect indications of a security breach event from several vehicles 100, 200, and the aggregated signals can be used to estimate the likelihood of that a security breach event has happened.

The vehicle system may be required to send a response back to the vehicle 100 verifying that the signals is to be interpreted as a security breach event, before the vehicle 100 issues any own visual/acoustic warning signals.

The visual and acoustic actuators in the vehicle 100 can also be used by other entities to help issue warning signals that a security breach has happened. The other entity can e.g. be the vehicle owner's house, but also other entities that can prove to be trusted by the vehicle can be the source of the request to signal a security breach. The trust verification of the requesting entity can be handled by running an authentication protocol before accepting the request to issue visual/acoustic warning signs.

The embodiments herein are not limited to the above described embodiments. Various alternatives, modifications and equivalents may be used. Therefore, the above embodiments should not be taken as limiting the scope of the embodiments, which is defined by the appended claims. A feature from one embodiment may be combined with one or more features of any other embodiment.

It should be emphasized that the term "comprises/comprising" when used in this specification is taken to specify the presence of stated features, integers, steps or components, but does not preclude the presence or addition of one or more other features, integers, steps, components or groups thereof. It should also be noted that the words "a" or "an" preceding an element do not exclude the presence of a plurality of such elements.

The term "configured to" used herein may also be referred to as "arranged to", "adapted to", "capable of" or "operative to".

The term "at least one of A and B" should be understood to mean "only A, only B, or both A and B."

It should also be emphasised that the steps of the methods defined in the appended claims may, without departing from the embodiments herein, be performed in another order than the order in which they appear in the claims.

The invention claimed is:

1. A method performed by a vehicle system for handling parameters associated with surroundings of a vehicle, the method comprising:
   obtaining information indicating a first parameter associated with the surroundings of the vehicle and sensed by at least one low power sensor, the low power sensor being associated with the vehicle;
   triggering startup of at least one high power sensor when the first parameter has fulfilled a criteria, wherein the high power sensor consumes a larger amount of power than the low power sensor, and the high power sensor being associated with the vehicle or another vehicle;
   obtaining information indicating at least a second parameter associated with the surroundings of the vehicle and sensed by the high power sensor;
   wherein the at least one low power sensor continuously or intermittently senses the first parameter and the at least one high power sensor senses the second parameter only when the first parameter has fulfilled the criteria;
   obtaining information indicating that the first parameter has been sensed and fulfilled the criteria for at least one other vehicle;
   determining that there is a likelihood of a security breach when the criteria has been fulfilled for at least two vehicles; and
   triggering the vehicle and the at least one other vehicle to activate their associated alarms when the likelihood is determined.

2. The method of claim 1, further comprising:
analyzing the first and second parameters to determine at least one of: a position in the surroundings where the first and second parameters have their origin, and a distance (d) from the vehicle to the position.

3. The method of claim 1, further comprising:
informing a user of the vehicle about the first and second parameters.

4. The method of claim 1, further comprising:
triggering an alarm associated with the vehicle when the first parameter has fulfilled the criteria.

5. The method of claim 1, further comprising:
triggering at least one other vehicle to activate its associated alarm when the first parameter has fulfilled the criteria.

6. The method of claim 1, wherein the criteria is at least one of: that the first parameter has reached or exceeded a threshold, and that the first parameter substantially matches a predetermined parameter.

7. The method of claim 1, wherein the first parameter is at least one of: sound, motion, smoke, and wherein the second parameter is at least one image.

8. The method of claim 1, wherein the low power sensor is at least one of: a microphone, a gyroscope, a smoke detector, an Infrared detector, and wherein the high power sensor is at least one of: an image sensor, a radar, a lidar.

9. The method of claim 1, wherein at least one of the low and high power sensors is mounted at least partly on the outside of the vehicle.

10. A vehicle system adapted to:

obtain information indicating a first parameter associated with the surroundings of the vehicle and sensed by at least one low power sensor, the low power sensor being associated with the vehicle;

trigger startup of at least one high power sensor when the first parameter has fulfilled a criteria, wherein the high power sensor consumes a larger amount of power than the low power sensor, and the high power sensor being associated with the vehicle or another vehicle;

obtain information indicating at least a second parameter associated with the surroundings of the vehicle and sensed by the high power sensor;

wherein the at least one low power sensor continuously or intermittently senses the first parameter and the at least one high power sensor senses the second parameter only when the first parameter has fulfilled the criteria;

obtain information indicating that the first parameter has been sensed and fulfilled the criteria for at least one other vehicle;

determine that there is a likelihood of a security breach when the criteria has been fulfilled for at least two vehicles; and trigger the vehicle and the at least one other vehicle to activate their associated alarms when the likelihood is determined.

11. A vehicle system, comprising:

memory storing instructions executed by a processor for obtaining information indicating a first parameter associated with the surroundings of the vehicle and sensed by at least one low power sensor, the low power sensor being associated with the vehicle;

the memory storing instructions executed by the processor for triggering startup of at least one high power sensor when the first parameter has fulfilled a criteria, wherein the high power sensor consumes a larger amount of power than the low power sensor, and the high power sensor being associated with the vehicle or another vehicle;

the memory storing instructions executed by the processor for obtaining information indicating at least a second parameter associated with the surroundings of the vehicle and sensed by the high power sensor;

wherein the at least one low power sensor continuously or intermittently senses the first parameter and the at least one high power sensor senses the second parameter only when the first parameter has fulfilled the criteria;

the memory storing instructions executed by the processor for obtaining information indicating that the first parameter has been sensed and fulfilled the criteria for at least one other vehicle;

the memory storing instructions executed by the processor for determining that there is a likelihood of a security breach when the criteria has been fulfilled for at least two vehicles; and the memory storing instructions executed by the processor for triggering the vehicle and the at least one other vehicle to activate their associated alarms when the likelihood is determined.

12. The vehicle system of claim 11, further comprising:

the memory storing instructions executed by the processor for analyzing the first and second parameters to determine at least one of: a position in the surroundings where the first and second parameters have their origin, and a distance (d) from the vehicle to the position.

13. The vehicle system of claim 11, further comprising:

the memory storing instructions executed by the processor for informing a user of the vehicle about the first and second parameters.

14. The vehicle system of claim 11, further comprising:

the memory storing instructions executed by the processor for triggering an alarm associated with the vehicle when the first parameter has fulfilled the criteria.

15. The vehicle system of claim 11, further comprising:

the memory storing instructions executed by the processor for triggering at least one other vehicle to activate its associated alarm when the first parameter has fulfilled the criteria.

16. The vehicle system of claim 11, wherein the criteria is at least one of: that the first parameter has reached or exceeded a threshold, and that the first parameter substantially matches a predetermined parameter.

17. The vehicle system of claim 11, wherein the first parameter is at least one of: sound, motion, smoke, and wherein the second parameter is at least one image.

18. The vehicle system of claim 11, wherein at least one of the low and high power sensors is mounted at least partly on the outside of the vehicle.

* * * * *